J. R. ABERCROMBIE.
RIM REDUCING AND EXPANDING IMPLEMENT.
APPLICATION FILED JAN. 21, 1922.

1,428,674. Patented Sept. 12, 1922.
2 SHEETS—SHEET 1.

WITNESSES
George C. Payer

INVENTOR
J. R. Abercrombie,
BY
ATTORNEYS

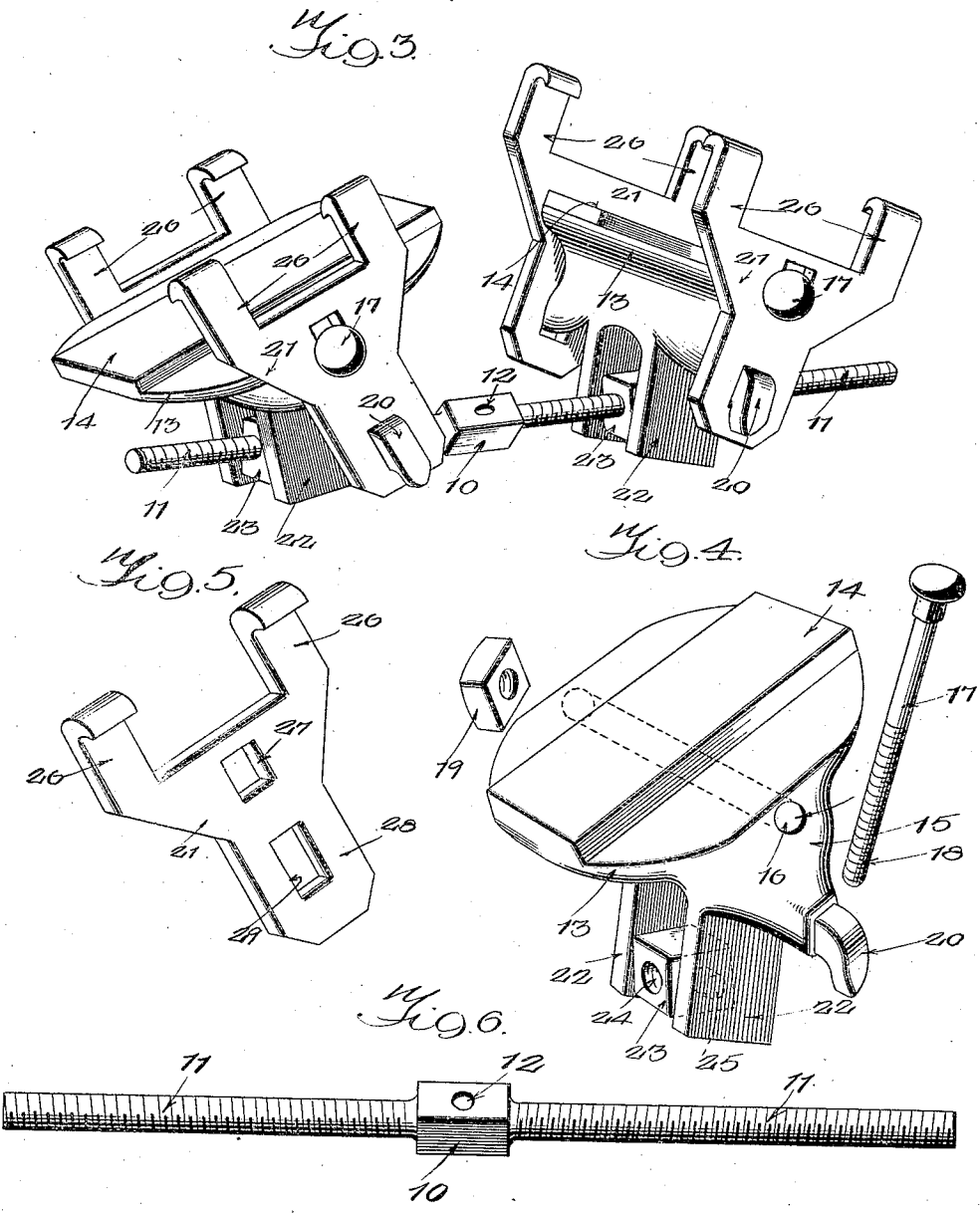

Patented Sept. 12, 1922.

1,428,674

UNITED STATES PATENT OFFICE.

JAMES R. ABERCROMBIE, OF SILOAM SPRINGS, ARKANSAS.

RIM REDUCING AND EXPANDING IMPLEMENT.

Application filed January 21, 1922. Serial No. 530,988.

*To all whom it may concern:*

Be it known that I, JAMES R. ABERCROMBIE, a citizen of the United States, and a resident of Siloam Springs, in the county of Benton and State of Arkansas, have invented certain new and useful Improvements in Rim Reducing and Expanding Implements, of which the following is a specification.

My present invention relates generally to rims supporting pneumatic tires and the like and more particularly to implements used in placing and removing tires from such rims, my object being the provision of an implement which will not only reduce the usual split rim and hold the same in reduced position during the removal and replacement of a tire but will also be equally effective in expanding the rim to the normal position after a tire has been placed thereon.

A further object is the provision of an implement of this character which may be readily applied to and removed from a rim, is of simple economical structure, involves a minimum number of parts, and one which will be strong and effective in use.

Figure 1:
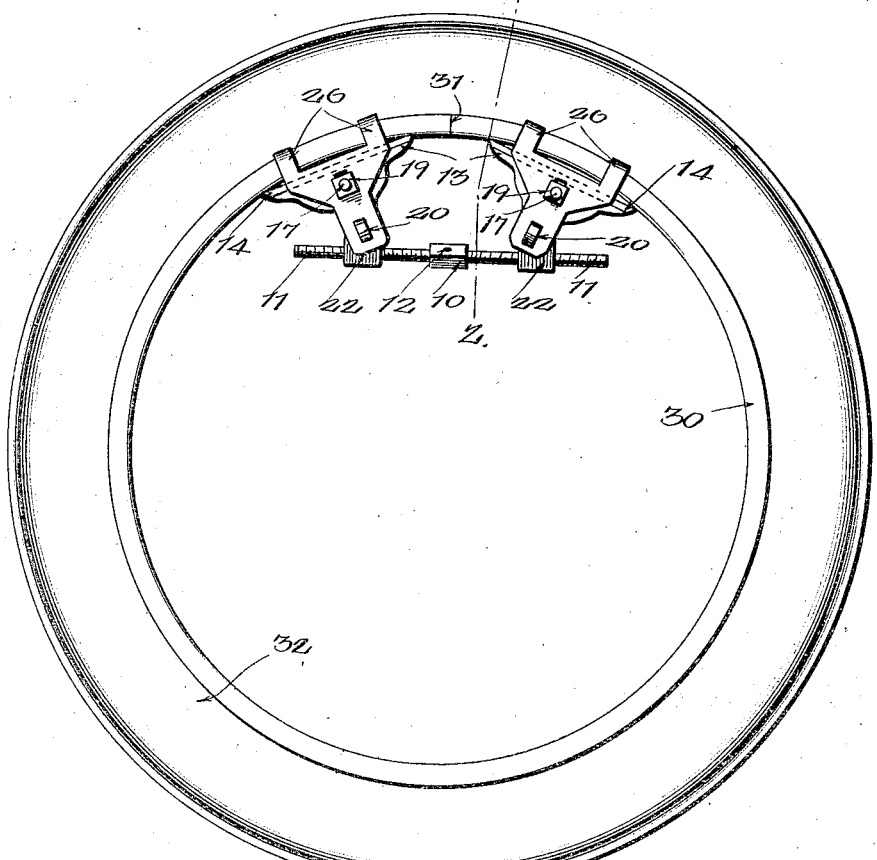
Figure 2:
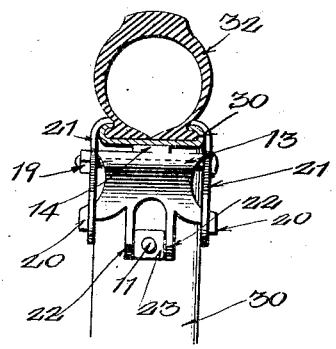

With the above in mind my invention resides in the implement to be now described with respect to the accompanying drawings, forming a part of this specification, and wherein, Figure 1 is a side view illustrating the practical application of my invention, Figure 2 is a radial section taken substantially on line 2—2 of Figure 1, Figure 3 is an enlarged perspective view of the implement removed, Figure 4 is a detail perspective view of certain parts of one of the clamping members, Figure 5 is a detail perspective view of one of the clamping plates, and Figure 6 is a detail side view of the threaded actuating rod.

Referring now to these figures my invention proposes a rim reducing and expanding implement consisting of a pair of clamping members which may be drawn toward and thrust away from one another by virtue of a connecting and actuating rod, the latter of which has a centrally enlarged and preferably squared portion 10 and oppositely threaded extensions 11 beyond the central squared portion, the latter of which provides for rotation of the rod through the use of a wrench or like implement, and may have an opening 12 therethrough as shown in Figure 6 for the reception of a pin forming a handle.

Each of the clamping members before referred to consists of a rigid body portion 13 having upon its upper face a rim engaging rib 14 and having a depending portion 15 transversely bored as at 16 for the reception of a clamping bolt 17, with one threaded end 18 of which a nut 19 cooperates.

This depending portion 15 of the body 13 has diametrically opposed laterally projecting and downwardly curved anchor lugs 20 for side clamping plates 21, one of which is shown in detail in Figure 5, and is further provided at its lower central portion with downwardly projecting parallel and laterally spaced ears 22 between which is a swiveled nut 23 whose threaded bore 24 receives one threaded extension 11 of the actuating rod before referred to. This swivel connection of the rod engaging nut 23 of each of the clamping members may be effected by means of side trunnions, one of which is indicated at 25 in Figure 4, adapted to enter conformable recesses in the inner surfaces of the ears 22.

Each of the clamping side plates 21 has laterally spaced upstanding rim engaging hooks 26 and is provided with a body opening 27 to receive the clamping bolt 17. Each clamping side plate is also provided with a depending portion 28 having a slotted opening 29 adapted to receive one of the side lugs 20 of the body or block 13 so that each clamping plate will thus be effectively held against angular displacement and a detachable pivot provided for its lower end upon which its upper portion may be drawn toward and shifted from a tire rim such for instance as indicated at 30 in Figures 1 and 2.

In practice the two clamping members are engaged with a tire rim 30 upon opposite sides of its split portion 31 and, as seen in Figure 1, the two clamping side plates of each clamping member are drawn snugly into engagement with the side flanges of the rim by tightening the clamping bolt 17 of each thereof. If the clamps are used at equidistantly spaced points upon opposite sides of the split ends of the rims as in Figure 1, one of these ends may be deflected inwardly by the use of an additional tool such as for instance an ordinary rim tool, but this deflection by another tool will not be necessary if one of the clamps is engaged with the rim at a point sufficiently spaced from the rim ends with the other clamp substantially at the rim ends. Then by rotating the actuating rod, whose oppositely threaded extensions engage through the correspondingly threaded nuts 23 of the two clamping members, the rim 30 may be reduced and held in reduced position while the tire 32 is removed therefrom and this or another tire subsequently replaced. Upon replacement of the tire the actuating rod is rotated in a direction opposite to that effective in reducing the rim, so as to expand the rim to the normal position, after which the clamping bolts 17 of the two clamping members are loosened, permitting detachment of the implement from the rim. By this construction the strain on the several parts of the implement in its use, is uniformly distributed among these parts so that the implement as a whole will be lasting and durable, and will utilize to the fullest advantage the simplicity and strength of its individual parts.

I claim:

1. An implement for reducing and expanding rims, including a pair of clamping members, each having a solid transversely bored body portion provided with a depending portion and with side lugs below the ends of its bore, a pair of clamping side plates having upper rim engaging hooks and also provided with body openings to aline with the bore of the body of the clamping member, and with lower slotted openings to receive the lugs of said body, clamping bolts extending through the bore of the body and through said clamping side plates, and a nut swiveled in the depending portion of the body, and an actuating rod having oppositely threaded side portions extending through the said swiveled nuts for shifting the clamping members toward and away from one another.

2. A rim reducing and expanding implement comprising a pair of clamping members and an actuating rod between said clamping members having oppositely threaded portions in engagement therewith, each of said clamping members having a rim engaging body portion provided with depending ears, a nut swiveled below the body portion and between the said ears and through which one threaded portion of the actuating rod extends, clamping side plates at opposite sides of the body portion having upstanding rim engaging hooks, said side plates and said body portion having alined apertures, and a clamping bolt extending through the alined apertures, and said body portion and said clamping plates having detachably engaging means located adjacent to the inner portions of the clamping plates to pivotally support the latter and prevent their rotation on the clamping bolt.

JAMES R. ABERCROMBIE.